Figure 1:
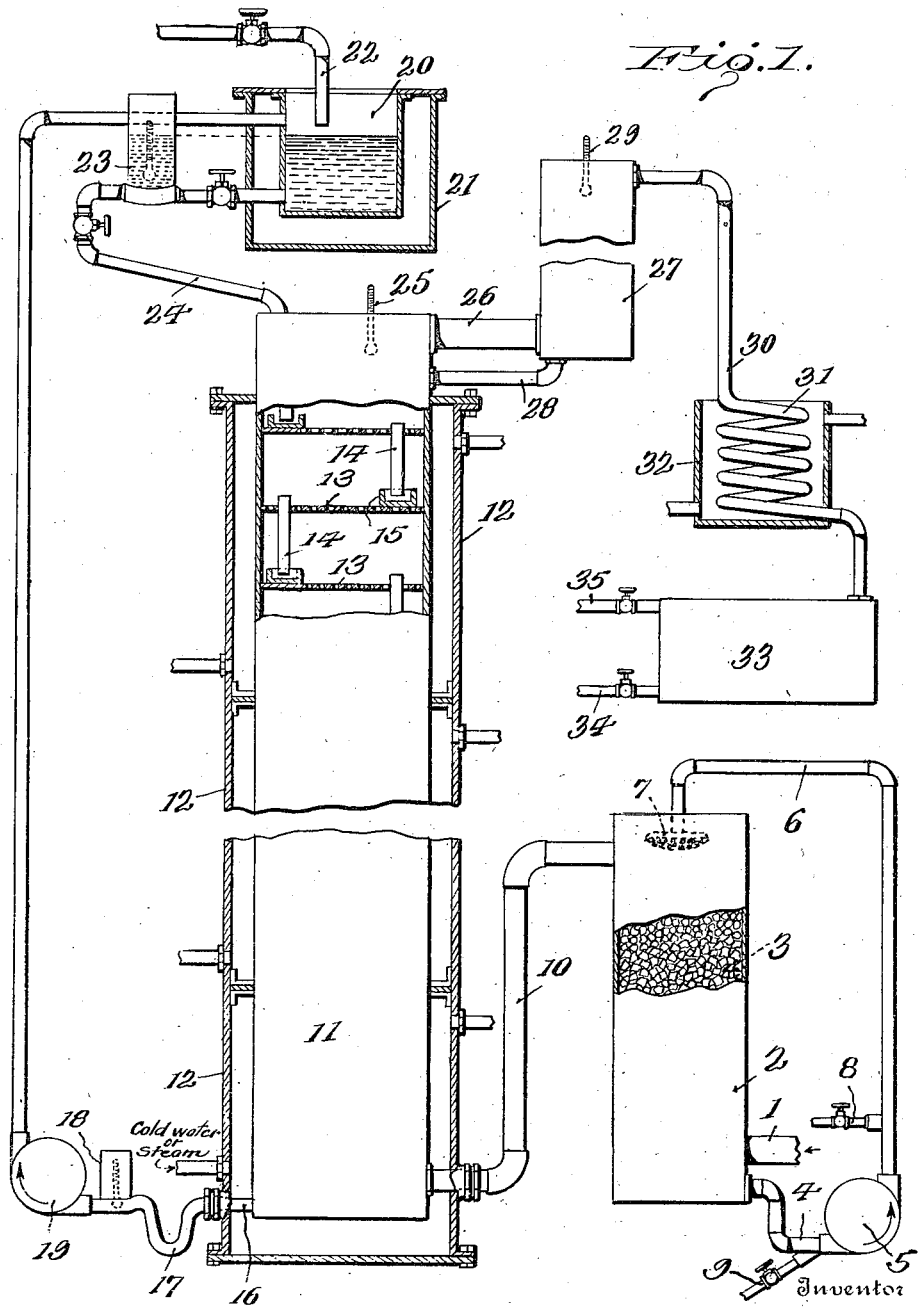

K. P. McELROY.
PROCESS OF MAKING ALCOHOLS.
APPLICATION FILED DEC. 22, 1917.

1,438,123.

Patented Dec. 5, 1922.

Patented Dec. 5, 1922.

1,438,123

UNITED STATES PATENT OFFICE.

KARL P. McELROY, OF WASHINGTON, DISTRICT OF COLUMBIA.

PROCESS OF MAKING ALCOHOLS.

Application filed December 22, 1917. Serial No. 208,424.

*To all whom it may concern:*

Be it known that I, KARL POMEROY MC-ELROY, a citizen of the United States, residing at Washington, in the District of Columbia, have invented certain new and useful Improvements in Processes of Making Alcohols, of which the following is a specification.

This invention relates to processes of making alcohols; and it comprises a method of converting the olefins of oil gas into the corresponding alcohols wherein such oil gas is passed through a heated reaction chamber in intimate contact with a bath containing an acid reacting with such olefins and at a high enough temperature to maintain produced alcohols in the vapor form, the emerging mixture of residual gases with vapor of water and of alcohols being then cooled to condense and recover such vapors and sufficient amounts of said bath being transferred from the point of initial contact with the gas to the point of final contact to ensure acidity throughout while maintaining a substantial higher acidity at the point of initial contact, sufficient water or steam being also added to the bath to compensate for water vapor carried forward with said emerging mixture; all as more fully hereinafter set forth and as claimed.

Ethyl alcohol, $C_2H_6O$, is closely related to ethylene, $C_2H_4$; differing therefrom by containing the elements of a molecule of water, $H_2O$; and isopropyl alcohol, $C_3H_8O$, is similarly related to propylene, $C_3H_6$. Ethylene may be readily made by heating alcohol with various concentrated acids of dehydrating properties (sulfuric acid, sodium bisulfate, boric acid, phosphoric acid, etc.), which remove the elements of a molecule of water allowing the ethylene to escape as a gas. Ethylene is customarily so made in laboratory practice. Propylene may be made in similar manner. It is a well known fact, though not commercially utilized, that ethylene or propylene may be absorbed by concentrated acids under various conditions, the acids then rediluted and alcohol (ethyl or isopropyl as the case may be) recovered by distillation. Ethylene is not taken up to any extent in cold strong sulphuric acid of 1.84 in a reasonable time; but is absorbed by stronger acid (fuming sulphuric acid). Hot acid of 1.84 or less strength takes it up with a fair degree of rapidity. In a measure, strength of acid and temperature are reciprocal factors in producing rapid absorption. On redilution of the acid to a strength corresponding to about 1.10 sulphuric acid and boiling, ethyl alcohol is formed. Propylene behaves in much the same way; but with the difference that it is much more quickly absorbed by acid. It is absorbed in the cold by sulphuric acid of 1.84 though not by acid of about, say, 1.6 specific gravity.

Hot acids of intermediate strengths tend to give intermediate results; that is an absorption of ethylene or propylene with a rehydration to ethyl alcohol or isopropyl alcohol as the case may be. In so doing the acid may be regarded as a purely catalytic body.

Phosphoric acid, boric (boracic) acid, various sulfonic acids, such as phenolsulfonic acid, hydrochloric acid, hydrobromic acid, hydriodic acid, acetic acid, etc., act in much the same way as sulphuric acid as do various acid sulphates, such as sodium bisulfate. Their action is not so rapid as that of sulfuric acid but they are not so prone to give decomposition products. Sulphuric acid is reducible to some extent and in use it is apt to give off more or less sulfur dioxid with a corresponding oxidation or breaking down of the olefins.

In the present invention I utilize the stated facts in the production of ethyl alcohol and isopropyl alcohol; more particularly the latter. Isopropyl alcohol is usually regarded as having the structural formula $CH_3.CH(OH).CH_3$ which differs from acetone, $CH_3.CO.CH_3$, by containing two more H atoms. This hydrogen is readily removed by oxidation converting isopropyl alcohol into acetone. Acetone is a body of great commercial importance, not only being the usual raw material for the manufacture of chloroform but being itself highly useful as a solvent in various relations.

As a raw material for the production of the alcohols and acetone, I employ petroleum oils; gasifying such oils by heat to obtain a gas as rich as possible in gaseous olefins, and particularly propylene, and then converting the olefins, or the propylene alone, into alcohol; isopropyl alcohol being then if desired converted into acetone. If desired, the ethyl alcohol so made may also be converted into acetone, being first oxidized to acetic acid and this then broken up by heat; thereby materially increasing the yield of acetone from a given amount of petroleum. Any petroleum oil or material, such as kerosene, gasoline, lubricating oils, solar oil, gas oil, petroleum residua, crude petroleum, wax tailings, etc., may be employed. Such an oil if passed through a red hot tube is converted into gas; and with proper methods of manipulation the gas will be rich in the gaseous olefins, ethylene and propylene. A good gas for the present purposes, containing about 50 per cent (by volume) of gaseous olefins, can be made by rapidly passing almost any petroleum oil through a hot zone at a temperature of about 700° C.; the rapidity of passage being such as to carry more or less unchanged oil past such hot zone. By sharply cooling the gas, the excess of oil condenses as a fog scrubbing out and carrying down with it various vapors (gasoline). It may be further purified from sulfur and other impurities in well known ways. It is sometimes useful to compress and chill it, to ensure removal of condensible bodies; or scrub it with a little chilled oil for the same purpose. As it runs, it will ordinarily carry about equal amounts of ethylene and propylene; but by arranging conditions so as to get as heavy a gas as possible, the proportion of propylene may be increased at the expense of the ethylene. In so operating however ordinarily the amount of still heavier cracked products (vapors of gasoline hydrocarbons, butylenes, amylenes, etc.) is still further increased, necessitating more drastic purification unless the alcohols corresponding to these heavier bodies are also wanted; as is often the case as hereinafter explained. Gases carrying ethylene and propylene may be made by the destructive distillation of many other organic materials, such as wood, soft coal, vegetable oils, etc., and such gases are equivalent for my purposes; but they are not ordinarily as rich or as desirable as the gas from petroleum oil. Whatever the gas used it should not be "fixed" (that is, superheated) since this breaks up the olefins. Instead of using oil gas and other mixtures containing olefins and other things, the pure olefins themselves may be used in the present invention; ethylene being, for example, made by hydrogenating acetylene and used according to the present process. Pure ethylene or pure propylene, or a mixture of the two gases may of course be made by liquefying the oil gas and fractionally distilling. Pure propylene so made may be very conveniently used for making isopropyl alcohol.

Oil gas in addition to the ethylene and propylene contains other gaseous and volatile olefins (the butylenes and amylenes) and various other unsaturated bodies, such as acetylenes and diolefins, in minor amounts. These may be removed by the chilling, scrubbing or compressing methods mentioned; or they may be allowed to remain in the gas. The butylenes and amylenes give alcohols of the nature of those contained in fusel oil; and these are commercially valuable. It is in general however advisable if no other special purifying method be adopted to scrub the gas with a little cold weak sulfuric or hydrochloric acid to remove various acid-sensitive impurities which resinify or polymerize to form tarry products whose accumulation is undesirable in the reaction chamber. With sulfuric acid, these bodies tend to cause blackening and development of $SO_2$.

In the present invention I contact oil gas, which may or may not have been previously scrubbed or otherwise purified, with a body or bath of hot acid in a suitable reaction chamber; the contact being as intimate as possible. This I do at such a temperature as will vaporize the alcohols formed. As previously stated, strengths of acid may be found which will act in, so to speak, a catalytic way; taking up the olefin and at once giving it off as alcohol vapor. Such strengths of acid however contain considerable water and this water goes forward with the alcohol vapor as vapor so that the strength of the acid is continually changing. If it be attempted to obviate this by supplying steam with the gas, the net result is that the acid becomes too weak at the point of contact with the gas and too strong at the point where the alcohol vapor and water vapors leave. I therefore use my bath in a relatively long reaction chamber with the bath at less than the catalytic acid strength at one end (the end where the vapors are removed) and above the acid strength at the other; the end where the gas first comes into contact. In so doing I am enabled to have the catalytic strength at some intermediate portion of the path of the gas through the reaction chamber; and I am also enabled to conjoin with this catalytic effect the absorption of gas in hot, relatively concentrated acid and its evolution as alcohol from a hot, relatively dilute acid. This I do by supplying portions of the more concentrated acid from the entrance end to the exit end; this supply being so managed as to prevent, on the one hand, undue concentration of acid at the feed end, and on the other undue dilution at the exit end. Contact of acid and bath may be in any suitable type of apparatus giving opportunity for a thorough and intimate commingling of gas and liquid. A rotating drum filled with pumicestone and the like, centrifugal spraying devices, etc. may be employed; but it is simpler and better to use an ordinary scrubbing tower or column still. I find an apparatus of the general type of a column still provided with cross plates or the like the most advantageous. With whatever apparatus I use, I aim to maintain the reaction chamber at a temperature between 80 and 100° C. at the point of exit of vapors; and to provide means for transmitting a portion of the more concentrated acid to the end where the vapors are delivered. Using a column still or scrubbing tower these means may take the form of a simple pump. In order to replace the water vapor carried forward with the residual gases and alcohol vapors, an addition of water or steam is necessary. A little water may be added to the acid returned to the top of the still; or steam may be blown into the still at an appropriate point.

The apparatus may be made of any acid resistant material, such as duriron, tantiron, etc.; or it may be lead-lined.

In the accompanying illustration I have shown, more or less diagrammatically, certain apparatus useful in the present invention. In this showing, Figure 1 is a view partly in elevation and partly in vertical section of a reaction chamber and accessory apparatus.

In the showing of Figure 1, oil gas or other gas consisting of or comprising gaseous olefins is introduced at 1 into preliminary scrubber or purifier 2. As shown, it is an ordinary scrubber provided with brick, stone or coke filling 3. Gas passes upward against downflowing acid, which may be weak sulfuric acid, say one part acid and three parts water, circulating in closed cycle through conduit 4, pump 5, conduit 6 and rose 7. Acid may be withdrawn at outlet 8 and fresh acid added at inlet 9. The gas passes forward through 10 and enters the base of reaction chamber 11. As shown, this is constructed generally like a column still save that it is provided with a heating jacket 12 extending upward over the main part of the column. Internally, it is provided with cup-and-shelf devices consisting of perforated plates 13 provided with liquid drains 14, sealed at 15. Strengthened acid containing absorbed olefins is withdrawn from the base of the column through drain 16, trapped at 17, past hydrometer casing 18 by means of pump 19 to acid tank 20, provided with heating jacket 21. In the tank as much water as may be necessary is added from 22 and the mixture sent past hydrometer casing 23 through valved conduit 24 to the head of the reaction chamber. Thermometer 25 allows observation of the temperature in the reaction chamber. The residual gases together with water vapor and alcohol vapor leave through conduit 26 and pass into the base of a short accessory column still 27, intended to send back part of the water to the reaction chamber through drain conduit 28. Thermometer 29 allows regulation of the temperature in the accessory column still. Uncondensed vapors and gases pass through conduit 30 to condenser 31 in tub 32. It is in general advisable to allow a considerable amount of water vapor to go forward past the column still with the alcohol to prevent undue losses of the latter as uncondensed vapors. The condensate may advantageously be as weak as 10 or 15 per cent alcohol. The condensate accumulates in tank 33 whence liquid may be removed by outlet 34 and residual gases by outlet 35. These waste gases may be used as fuel or any other suitable purpose. A portion may be returned to the gasifying zone in order to aid, under well understood principles, in the production of greater quantities of olefins from the oil. If the apparatus be run in such a manner that hydration is wholly, or mostly, confined to the propylene, the contained ethylene may be utilized in any suitable manner. The waste gases if reheated will give a certain amount of olefins; and they may be thus treated.

The operation of the above structure is plain from the foregoing description. The reaction chamber is supplied with a suitable amount of any desired acid. Ordinarily I use sulfuric acid or crude phosphoric acid made by treating calcium phosphate with sulfuric acid. A strong solution of sodium bisulfate may be employed. The concentration used at the base of the reaction tower depends upon the temperature at this point; and is maintained as high as practicable without formation of ether or too much blackening while at the top I aim to have an acid of 10 to 20 per cent strength when using sulfuric acid. If only propylene is to be hydrated, the acid strength at the base is kept weaker that if ethylene is to be hydrated as well. Presuming both are hydrated, the condensate will be a mixture of ethyl alcohol and isopropyl alcohol which are separated by ordinary distillation methods in ordinary apparatus. In case the oil gas used is not purified and still contains butylenes, amylenes and vapors of hexylenes, the product in the hydrating operation will contain the corresponding alcohols which may be isolated by well known methods and marketed for the purpose of fusel oil.

The isopropyl alcohol is an excellent solvent and may be sold and used as such, or it may be oxidized to form acetone. This may be done by hot copper and air in a manner analogous to the formation of aldehydes; but I find it more advantageous to oxidize, electrolytically.

In any process of making alcohol by hydrating olefins with hot acid, it is very difficult to maintain a body of acid of any exact strength since water is being constantly subtracted by the removal of vapors and must be as constantly added for replenishment. But by the simple expedient of using a relatively long column of acid liquid stronger than catalytic strength at one end and weaker than catalytic strength at the other, catalytic strength can be maintained at intermediate points. In practice, the zone of catalytic strength shifts its location back and forth intermediate the ends but always exists somewhere. In the particular apparatus shown opposing tendencies exist and it is easy, by suitable counterbalancing of these, to run it as desired. Addition of replenishing water (or steam) being at the top, the concentrating effect of the column tends to produce high acidity at the base while the pump and pipe system tend to equalize acidity throughout, the most concentrated acid being sent to the point of least acidity. In practice, I aim to correlate gas feed, heat, pump speed and the height and other dimensions of the column so that the ethylene and propylene of oil gas (or the propylene only) are substantially completely absorbed in passage and so that the basal liquid absorbs as much as is practicable without unduly blackening up or forming tar. The solution so formed is of course delivered to the top of the column for redilution and formation of alcohol. Pressure aids absorption and gives greater capacity to a given apparatus; but is not necessary.

The described process may of course be used for making other alcohols than ethyl and isopropyl; as, for example, butyl and amyl alcohols. For this purpose, petroleum oils are cracked at lower temperatures; say at 400° to 600° C; and the appropriate olefins produced. The butylenes are readily condensible gases; and to make them, cracking may be at about 500° C. and the resultant gases may be compressed and chilled to separate the butylenes. The amylenes are readily volatile liquids which may be made in any of the usual ways for cracking to make gasoline; the portions of the condensate boiling between 20° and 40° C. being separated by fractional distillation. The vapors of the material so obtained may be run through the reaction chamber in contact with acid in the manner previously described.

In the process of making alcohols described it will be noted that I am utilizing both the principle of absorbing olefins in relatively concentrated acid and then rediluting and distilling to make alcohols, and that of passing the olefins in contact with hot acid of "catalytic" strength.

In making isopropyl alcohol from oil gas or propylene and using a preliminary acid scrub to remove acid-sensitive impurities, the acid is of course used cold and weak to prevent any substantial absorption of propylene.

In the manufacture of alcohol, various facilitating catalysts, such as mercury salts, copper salts, etc., can be employed to hasten absorption and conversion; but they are not necessary and make the acid bath more corrosive to metal parts of the apparatus.

What I claim is:—

1. In the manufacture of alcohols, the process which comprises passing a current of oil gas in intimate contact with a bath of hot dilute acid at a temperature sufficient to volatilize alcohols formed by the hydrating action of the acid, the bath being acid throughout but being of substantially greater acidity at the point of initial contact with said gas than at the point of final contact.

2. In the manufacture of alcohols, the process which comprises passing a current of oil gas in intimate contact with a bath of hot dilute acid at a temperature sufficient to volatilize alcohols formed by the hydrating action of the acid, the bath being acid throughout and being in movement from said point of greater acidity to the point of lower acidity, the acidity at such point of initial contact being sufficiently great to permit absorption of olefins by the bath and the acidity at such point of final contact being sufficiently low to permit evolution of alcohol vapors.

3. The process of making alcohols which comprises establishing and maintaining a body of hot dilute acid in downward movement, passing a current of oil gas upwardly in intimate contact with the downwardly passing acid, removing alcohol vapors, water vapor and residual gas after such contact, removing concentrated acid liquid after completion of its downward movement and returning it to repeat the downward passage and adding to the concentrated acid so returned an amount of water sufficient to compensate for the amount of water vapor passing forward with said alcohol vapors.

4. In the manufacture of alcohols, the process which comprises passing a gaseous current comprising olefins in intimate contact with a bath of hot dilute acid at a temperature sufficient to volatilize alcohols formed by the hydrating action of the acid, the bath being acid throughout but being of substantially greater acidity at the point of initial contact with said gas than at the point of final contact.

5. In the manufacture of alcohols, the process which comprises passing a gaseous current comprising olefins in intimate contact with a bath of hot dilute acid at a temperature sufficient to volatilize alcohols formed by the hydrating action of the acid, the bath being acid throughout and being in movement from said point of greater acidity to the point of lower acidity, the acidity at such point of initial contact being sufficiently great to permit absorption of olefins by the bath and the acidity at such point of final contact being sufficiently low to permit evolution of alcohol vapors.

6. The process of making alcohols which comprises establishing and maintaining a body of hot dilute acid in downward movement, passing a gaseous current comprising olefins upwardly in intimate contact with the downwardly passing acid, removing alcohol vapors, water vapor and residual gas after such contact, removing concentrated acid liquid after downward passage and returning it to repeat the downward passage, and adding to the concentrated acid so returned an amount of water sufficient to compensate for the amount of water passing forward with said alcohol vapors.

7. In the manufacture of alcohols, the process which comprises passing a gaseous current comprising propylene in intimate contact with a bath of hot dilute acid at a temperature sufficient to volatilize alcohols formed by the hydrating action of the acid, the bath being acid throughout but being of substantially greater acidity at the point of initial contact with said gas than at the point of final contact.

8. In the manufacture of alcohols, the process which comprises passing a gaseous current comprising propylene in intimate contact with a bath of hot dilute acid at a temperature sufficient to volatilize alcohols formed by the hydrating action of the acid, the bath being acid throughout and being in movement from said point of greater acidity to the point of lower acidity, the acidity at such point of initial contact being sufficiently great to permit absorption of propylene by the bath and the acidity at such point of final contact being sufficiently low to permit evolution of alcohol vapors.

9. The process of making alcohols which comprises establishing and maintaining a body of hot dilute acid in downward movement, passing a gaseous current comprising propylene upwardly in intimate contact with the downwardly passing acid, removing alcohol vapors, water vapor and residual gas after such contact, removing concentrated acid liquid after downward passage and returning it to repeat the downward passage, and adding to the concentrated acid so returned an amount of water sufficient to compensate for the amount of water passing forward with said alcohol vapors.

10. In the manufacture of isopropyl alcohol, the process which comprises gasifying oil to make a gas comprising propylene, hydrating said propylene to isopropyl alcohol by passing the propylene in intimate contact with a bath of hot dilute acid of progressively decreasing acidity; portions of more concentrated liquid being transferred to points of less concentration to maintain acidity throughout, and removing and condensing vapors of isopropyl alcohol.

In testimony whereof, I affix my signature hereto.

K. P. McELROY.